June 13, 1961  F. PETERS  2,988,584
PERMANENTLY GASTIGHT ENCLOSED ALKALINE ACCUMULATOR
Filed Nov. 3, 1953
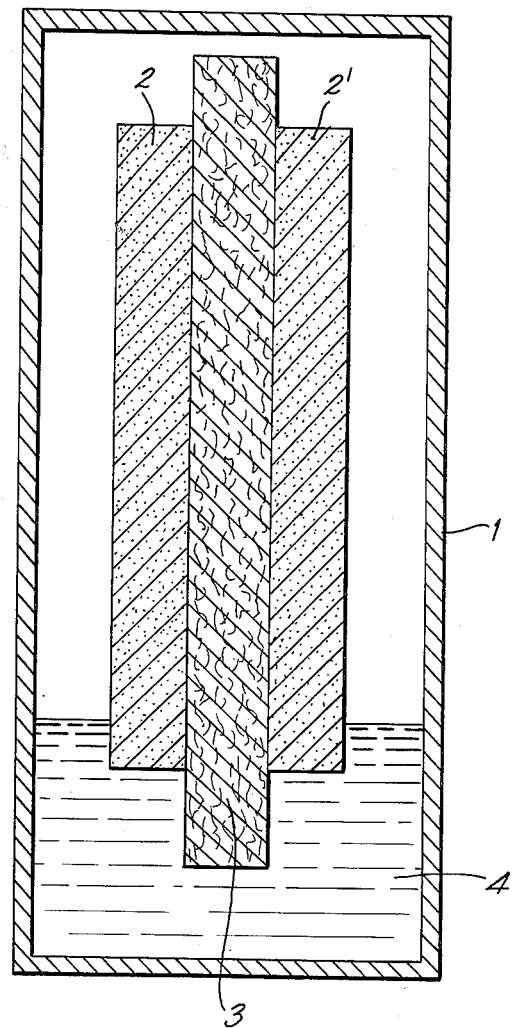
INVENTOR.
Helmut Peters
BY
Michael S. Striker
Attorney

United States Patent Office 2,988,584
Patented June 13, 1961

2,988,584
PERMANENTLY GASTIGHT ENCLOSED
ALKALINE ACCUMULATOR
Freimut Peters, Hagen, Westphalia, Germany, assignor to Accumulatoren-Fabrik Aktiengesellschaft, Frankfurt am Main, Germany
Filed Nov. 3, 1953, Ser. No. 390,103
Claims priority, application Germany Nov. 10, 1952
5 Claims. (Cl. 136—9)

The present invention relates to a permanently gastight enclosed alkaline accumulator, with electrodes of known design such as sintered, pressed, pocket, tubular, folding band, or other forms.

It has already been suggested to make permanently gastight enclosed alkaline accumulators in which the electrolyte necessary for the flow of current between electrodes of opposite polarity is completely fixed in porous separators. This arrangement was based on the assumption that the complete fixation of the electrolyte is absolutely required for effecting the necessary gas absorption by the active materials of the electrode plates, whereby the gastight enclosure of the accumulator was made possible.

Tests have shown, however, that it is not really necessary to provide for a complete fixation of the electrolyte; moreover, such complete fixation entails certain disadvantages relating to voltage, capacity, and useful life of the accumulator.

Thus, if the positive material used is the conventional nickel hydroxide mixed with graphite, it is known and cannot be prevented that part of the admixed graphite is oxidized to $CO_2$ upon charging. By the gradual increase in carbonate of the small amount of electrolyte within the pores of the active mass, the capacity and useful life of the negative electrode are impaired, since this electrode is sensitive to the contents of the electrolyte in carbonate.

Moreover, it is not in every case possible to maintain the cells as a whole at an even temperature at all times; they are, however, frequently exposed to the changes of the atmospheric temperatures. It may, thus, occur that the walls of the cell, which usually consist of metal in view of the required strength, acquire a lower temperature due to the high heat-conductivity of the metal than the interior of the cell, which is under the influence of heat generated by the current.

As a consequence, water from the atmosphere of the cell interior will condense on the colder walls of the cell and some water will thereafter evaporate from the electrolyte due to the fact that by the condensation of steam on the walls of the cell the equilibrium of the system water-steam is continually disturbed. In this way, the electrolyte in the pores of electrode plates and of the separator becomes increasingly more concentrated and poorer in water. The rising dehydration is accompanied by an impairment of the voltage conditions, due to the increase of the inner resistance; also, capacity and useful life of the accumulator are reduced.

According to previous suggestions, the porous nonconducting separator provided for the absorption of electrolyte in permanently enclosed alkaline accumulators is supposed to comprise parts which are capable of retaining the electrolyte by capillary action and, besides, some hollow spaces in which the developed gases collect and will be in contact with the electrodes of opposite polarity. It has, for instance, been suggested to use a fabric of twisted threads, which absorbs by capillarity, and which has at the same time large-size mesh providing the hollow spaces. Related suggestions provide a negative electrode of higher charging capacity than the positive electrode at the time when the cell is enclosed in a gastight manner, whereby a separate treatment of the negative electrode becomes dispensable.

It has now been discovered that the above mentioned inconveniences of carbonate accumulation and dehydration can be avoided, without providing for any special treatment of the negative electrode, by using according to the present invention, one of the known absorptive separators and providing in the cell container a space below the electrodes in which additional electrolyte is freely movable.

As absorptive separators I may use for instance:

Microporous soft rubber or hard rubber membrane,
Microporous foils of plastics,
Sheets of foam rubber or foam plastics,
Electrolyte absorbing membranes made of cellulose or polyvinyl alcohol,
Electrolyte absorbing mats made of non-twisted threads consisting, for instance, of some plastic,
Filter paper, and fabrics of closely woven threads.

When the electrodes have a sufficiently smooth surface, it is possible to use smooth non-absorptive separators of plastics with a perforation produced by mechanical means or otherwise, because in this case the electrolyte is attracted and raised in the narrow space between the plate and the separator by capillary action. It is, however, preferable to use absorptive separators.

It is a common property of the known separators that they are capable of absorbing the electrolyte and that they possess in addition to a compact cohesive portion of a structure, an absorbent capillary system, but no special hollow spaces for gas accumulation; in other cases, they consist of untwined fiber material with capillary interstices, or of closely woven twined fiber material.

These separators absorb, due to their capillarity, the electrolyte necessary for the flow of current between plates of opposed polarity.

From these known separators the arrangement according to the invention, as mentioned above, is distinguished by the provision of an additional quantity of electrolyte in the cell which is freely movable.

The additional quantity of electrolyte may be so chosen that the electrode plates and the separator are immersed in the electrolyte. According to the invention it is, moreover, possible to have only the separator immersed in the electrolyte; in this case, the separator is made longer than the plates and projects downwardly below their lower ends. Due to a wick action of the separator and the electrode plates, new electrolyte can continually rise, whereby a provision is made to supply the separator and the electrode plates continually with electrolyte, so that they will not dry up. Furthermore, carbonate which is formed by oxidation, will diffuse downwardly into the additional electrolyte, so that any harmful accumulation of carbonate in the pores of the electrode plates and the separator will be counteracted. By the measures according to the invention, the voltage condition in gastight enclosed accumulators as well as their capacity are preserved and the useful life of the accumulator is increased.

It has furthermore been found that in gastight cells according to this invention, i.e. cells which use an absorptive separator and an additional amount of electrolyte, it is not necessary to treat the negative electrode differently from the positive electrode.

Thus, it is within the scope of the present invention to provide a permanently gastight enclosed alkaline accumulator which comprises a container, a unit in the container including electrode plates, an absorptive separator between the plates, electrolyte absorbed in the separator for the flow of current between the electrode plates, and an additional quantity of unabsorbed electrolyte in the container contacting at least a part of the unit, preferably a portion of the separator projecting beyond edges of the electrode plates and immersed in the additional electrolyte.

The invention is illustrated in the drawing which shows a schematic cross-sectional view of a battery according to the present invention.

Referring now to the drawing, reference numeral 1 denotes the gastight closed container or casing, the absorbent separator is indicated by reference numeral 3, the electrodes of opposed polarity by numerals 2 and 2', and an additional quantity of electrolyte in an auxiliary space into which separator 3 extends, is indicated by reference numeral 4. Reference numeral 4 serves to denote either free flowing electrolyte, or a porous sponge-like body in which electrolyte is fixed and thus immobilized.

According to one embodiment of the gastight enclosed alkaline accumulator, the separator projects on all sides beyond the plates, thus extending beyond them laterally and at the upper edge, as well as the lower edge thereof. Furthermore, the free spaces around the plates may be so dimensioned that the plates and/or the separator are immersed in the surplus electrolyte, so that the gastight enclosed cell will in any position be operable with the advantages set forth above.

In some cases it may be desirable to immobilize the additional electrolyte, for instance in order to prevent the contact between the electrolyte and other parts of the cell interior, such as gas electrodes, which may be provided additionally for gas consumption. According to a modified embodiment of the invention this can be accomplished by fixation of the additional electrolyte in a manner known per se, or by causing the same to be absorbed by a porous body in a sponge-like manner.

It is of no consequence which type of electrodes—sintered, pressed, pocket, folding band, tubular, or other electrodes—are used in the gastight enclosed accumulator according to the invention. Furthermore, it is unimportant how the active masses are composed, and in which condition of charge the active masses of opposed polarity are with respect to each other; the improvements brought about by the present invention will always be effective.

What is claimed is:

1. A permanently gastight enclosed alkaline accumulator, comprising a container; a unit in said container including electrode plates of opposed polarity, microporous separator means forming a microporous capillary system and being free of any special spaces for gas accumulation located between said plates; an alkaline electrolyte absorbed in said separator means by capillarity, said electrolyte enabling the flow of current between the plates of opposed polarity, thus preventing the accumulation or passage of gas bubbles respectively through said separator and an electrolyte-free gas space in said container around said unit and in contact with said electrodes of opposed polarity.

2. Accumulator according to claim 1 and containing in said container an additional amount of freely movable electrolyte, thus supplying said separator means and said electrode plates of opposed polarity continually with the electrolyte.

3. Accumulator according to claim 2, said additional electrolyte contacting said unit consisting of said electrode plates of opposed polarity and said separator means between said plates.

4. Accumulator according to claim 3, wherein said electrolyte contacts said microporous separator means of said unit in every position of the container.

5. Accumulator according to claim 4, wherein said additional electrolyte contacting said unit is immobilized by fixing in a porous sponge-like body.

References Cited in the file of this patent

UNITED STATES PATENTS

| 718,205 | Hutchison | Jan. 13, 1903 |
| 897,833 | Hubbell | Sept. 1, 1908 |
| 2,571,927 | Naumann et al. | Oct. 16, 1951 |

FOREIGN PATENTS

| 574,616 | Great Britain | June 28, 1944 |